Figure 1:
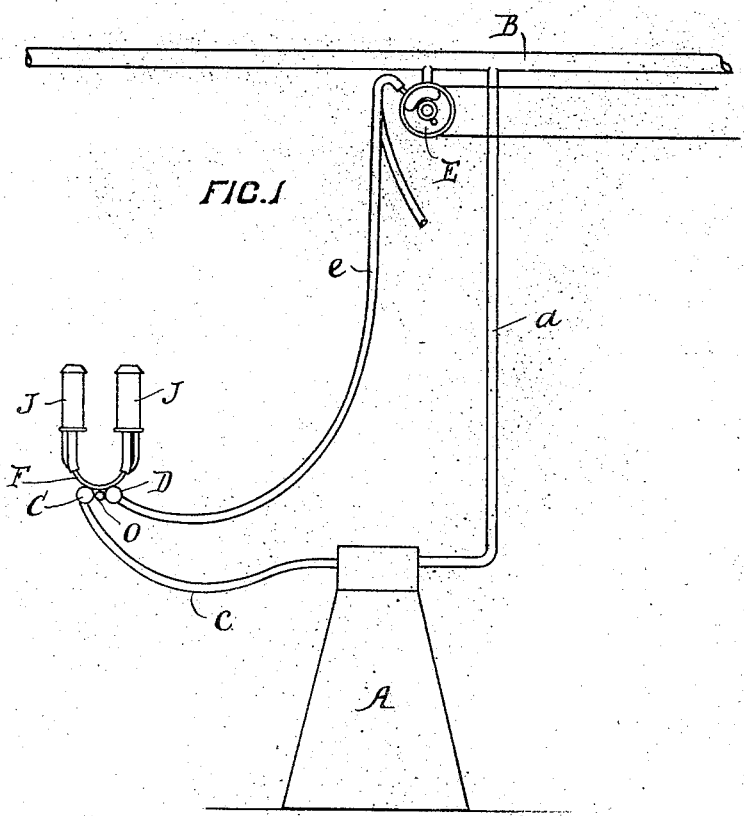

No. 890,376. PATENTED JUNE 9, 1908.
A. RIDD.
MILKING MACHINE.
APPLICATION FILED JAN. 28, 1908.

2 SHEETS—SHEET 1.

WITNESSES
W. P. Burke
W. H. Kennedy

INVENTOR
Ambrose Ridd
ATTY

No. 890,376. PATENTED JUNE 9, 1908.
A. RIDD.
MILKING MACHINE.
APPLICATION FILED JAN. 28, 1908.

2 SHEETS—SHEET 2.

WITNESSES
INVENTOR
Ambrose Ridd

UNITED STATES PATENT OFFICE.

AMBROSE RIDD, OF WAIPUKU, NEW ZEALAND.

MILKING-MACHINE.

No. 890,376.

Specification of Letters Patent.

Patented June 9, 1908.

Application filed January 28, 1908. Serial No. 413,003.

*To all whom it may concern:*

Be it known that I, AMBROSE RIDD, subject of the King of Great Britain, residing at Waipuku, in the Dominion of New Zealand, have invented a new and useful Improvement in or Relating to Milking-Machines; and I do hereby declare the following to be a full, clear, and exact description of the same.

This invention relates to that class of milking machines in which a vacuum is employed for the purpose of drawing the milk from the cow's teats to a milk can, and in which teat cups are employed, one of which is placed upon each teat, which cups are in communication with the can, and each one of which is composed of an outer casing and an inner lining, which lining is adapted to be "pulsated", that is, to be inflated and deflated so as to alternately squeeze and release the teat simultaneously with the drawing action of the vacuum upon the teat.

The invention has been designed in order to provide for a new construction of teat cup, and especially of the inner lining thereof, by means of which construction the pressure of the lining upon the teat, when it is inflated, may be caused to closely resemble the pressure of the human hand when hand milking is being performed; and to provide an improved "pulsator", or means whereby the inflation and deflation of such lining may be regularly and alternately effected by connecting the space surrounding the lining with the atmosphere and vacuum; and, also, to provide for the draw of the vacuum upon the teat being intermittently broken simultaneously with the release of the pressure of the teat cup lining thereon, so as to resemble the action of a calf's suction.

The invention is illustrated in the accompanying drawings, in which,—

Figure 2:
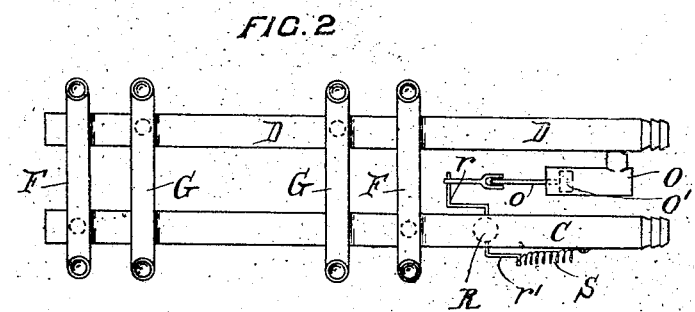
Figure 3:
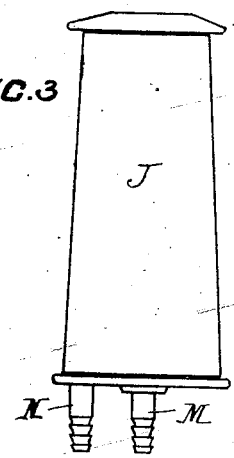
Figure 4:
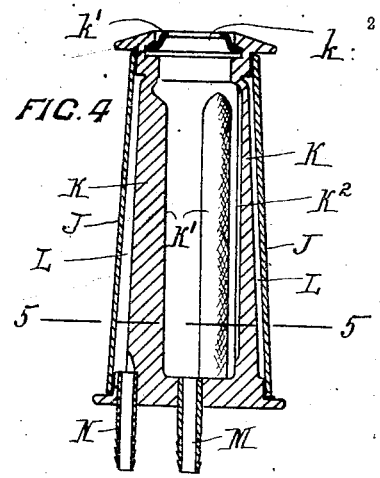
Figure 5:
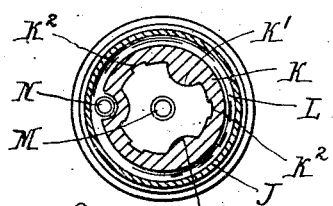
Figure 6:
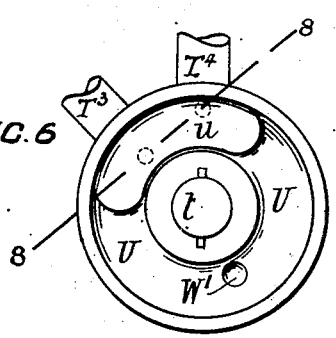
Figure 7:
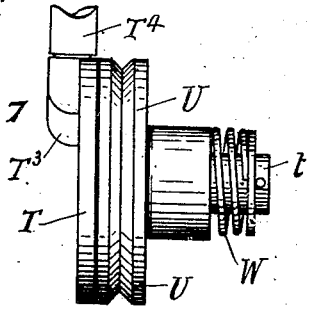
Figure 8:
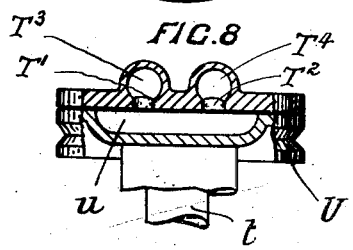
Figure 9:
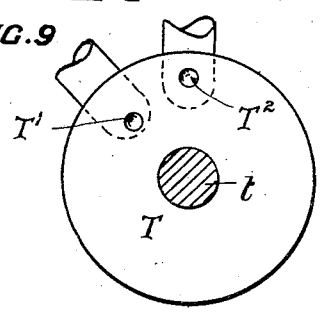

Figure 1 is a general view of the appliances embodying the invention. Fig. 2 is a detail on an enlarged scale showing an ordinary form of teat cup claw employed in milking machinery, and the means now designed for intermittently breaking the draw of the vacuum upon the cow's teats. Fig. 3 is an elevation of one of the teat cups employed and constructed according to this invention. Fig. 4 is a sectional elevation thereof. Fig. 5 is a sectional plan taken on the line 5—5 of Fig. 4. Fig. 6 is a front view of the improved pulsator employed in this invention. Fig. 7 is a side elevation thereof. Fig. 8 is a sectional plan taken on the line 8—8 of Fig. 6, and Fig. 9 is a face view of one portion of the pulsator.

The appliances employed consist of the usual milk can A, which is connected by means of the branch $a$, with a pipe main B, through which a vacuum is obtained and maintained in the main, and can, by any approved and well known means.

From the can a flexible pipe connection $c$ leads to the teat cup claw. This claw is constructed in the manner shown in Fig. 2, and is composed of two parallel pipes C and D, one of which, C, is connected with the pipe $c$ leading to the milk can, while the other, D, is connected with the flexible pipe $e$, leading to a pulsating appliance E, to be hereinafter described. Attached to these two pipes are the four cross pipes, F, F, and G, G, each one formed with upwardly turned open ends. The cross pipes F, F, are open to the pipe C, so that the draw of the vacuum in the milk can A, will be exerted through such pipes. The cross pipes G, G, are connected with the pipe E, so that the pulsations caused therein will be exerted through them. Four teat cups are fixed to the claw, and these four cups have their central spaces within the linings connected with the respective four ends of the cross pipes F, F, while the annular spaces between the linings and the casings of the four cups are respectively connected to the four ends of the cross pipes G, G. These connections and appliances are well known, and form no feature of this invention. Their action is that, while the vacuum in the milk can is drawing on the teats placed within the cups, the linings thereof will be alternately inflated and deflated, so that the suction on the teats will be aided by a regular squeezing and releasing of the teats, thus assisting the flow of the milk therefrom, which then will flow along the connection $c$ to the can A.

The construction of teat cup is shown in the drawings, Figs. 3, 4 and 5. The cup is formed with the ordinary outer cylindrical casing J, and the inner rubber lining K fitting therein in such a manner as to leave the clear annular space L around it. This lining is carried up over the top edge of the casing, and is formed with a central opening $k$ adapted to pass over a cow's teat. An annular metal plate $k'$ fits within a groove in the edge of this opening, and serves to prevent the lining being withdrawn from its casing and at the same time to afford a mouthpiece to surround the teat.

M is the usual connection leading from the inside of the cup, and joined with the top end of one of the cross pipes F of the claw, and N is the usual connection leading from the annular space L, and joined with the top end of one of the cross pipes G of the claw.

In the present invention, the lining K is formed with three projecting ribs K' on its inside surface and extending down the full length thereof at equal circumferential distances apart. It is also formed of uniform internal diameter from top to bottom thereof, but of regularly increasing external diameter towards its bottom end, as shown in Fig. 2. This increase in the thickness of the lining towards its bottom end will insure that when the lining is inflated by the admission of air to the space L the top, or weaker, end will be forced out first, and the inflation will gradually work downward. Thus the pressure exerted upon a teat placed within the cup, will be applied first to the root of the teat, and will gradually work down to its point. Likewise, when the lining is deflated by withdrawing the air from the space L, the root of the teat will first be released from the pressure, and the releasing action will work down to the teat's point. Thus it will be insured that the whole of the milk in the teat will be squeezed from it.

The ribs K' will, as the lining is inflated, first make contact with the teat, and will resemble in their pressure upon the teat, the pressure of the balls of the human fingers when milking by hand. If desired, the inside wall of the lining may be formed with grooves K² extending down its surface between the ribs. These grooves will serve to weaken the lining at those points, and thus assist in the result obtained by the use of the ribs.

The means designed for intermittently stopping the draw of the vacuum on the teats simultaneously with the release of the teat cup lining's pressure thereon, are shown in Fig. 2. These means consist of a small cylinder O, closed at one end and at its closed end, connected with the pipe D leading to the pulsator. A piston O' (shown by dotted lines) is placed within the cylinder and a piston rod o projects from the open end thereof. A butterfly or like valve R (shown by dotted lines) is mounted within the pipe C upon pivot pins which project outside the pipe and are formed in one with cranks r and r' arranged oppositely to each other. The crank r is connected to the piston rod o, while the crank r' is connected to one end of a spring S, which normally keeps such crank pulled towards it, and the cylinder piston drawn out towards the open end of the cylinder in the manner shown in the drawings. The valve R is so attached to the cranks that when they are in this position, the valve is opened, and a free passage along the pipe C, provided.

When the pipe D is connected by the action of the pulsator, with the vacuum main B, to deflate the teat cup lining, the suction of such vacuum will draw the piston O' into the cylinder, thereby turning the cranks r and r' in such a manner as to close the valve R against the action of the spring S, and thereby check the suction of the vacuum through the pipe C while the lining is being deflated and the squeeze upon the teat removed. When the pipe D is connected with the atmosphere, by the action of the pulsator, in order to inflate the teat cup lining, the draw on the piston O' will be removed so that the spring S will open the valve again and draw the piston outwards in the cylinder. Consequently, the valve R will be regularly opened and closed simultaneously with the inflation and deflation of the lining, thus insuring that the suction on the teats will occur simultaneously with the squeezing action of the teat cup linings thereon.

The pulsator that has been designed, and as shown in Figs. 6 to 9 of the drawings, consists of a disk T provided with a bearing t projecting centrally from its face. On such bearing, a wheel U is mounted, such wheel having a flat surface adjacent to the face of the disk. This wheel is kept in close contact with the disk by means of a spring W surrounding the outer end of the bearing, and pressing against the outer surface of the wheel. The wheel is adapted to be rotated by any suitable appliance.

The disk T is formed with two holes T' and T² therein, these holes opening respectively into the bottom ends of passages T³ and T⁴ which are connected respectively with the pipe connection e leading to the pipe D of the teat cup claw before described, and to the vacuum main B. The wheel U is provided with a passage way u formed on its surface adjacent to the disk, this passage being of sufficient length and so adjusted that it will extend across and connect the two holes T' and T² together, when the wheel is at a certain position of its rotation.

The wheel is also formed with a hole W' passing right through it, and arranged approximately at a position diametrically opposite to the passage u. This hole is so disposed that as the wheel is rotated, it will pass the hole T' and coincide therewith for a short period, thereby allowing the atmospheric air to pass through it into the hole T'.

It will be seen that as the wheel is revolved, it alternately causes connection to be made between the holes T' and T² through the passage u (as shown in Fig. 8) so that the draw of the vacuum in the pipe B will be communicated through them to the connection e and pipe D, and from it, to the spaces around the teat cup linings; and then for connection to be made with such spaces and the atmosphere through the hole T' in the disk and the hole W' in the wheel. Consequently, the spaces L around the linings of the teat cups will, in this manner, be alternately deflated and inflated as required. The length of time the connection e will be in communication with the vacuum and with the atmosphere, will be regulated by the speed at which the wheel U is rotated. In practice, one of these pulsators may be used to actuate two sets of teat cups.

What I do claim as my invention, and desire to secure by Letters Patent, is,—

1. In milking machines, a teat cup having an outer casing and an inner inflatable lining formed with a wall increasing in thickness towards its bottom end, but of uniform internal diameter, and with three projecting ribs extending down its inside surface at uniform circumferential distances apart, substantially as specified.

2. In milking machines, the combination with a teat cup having an outer casing and an inner inflatable lining formed with a wall increasing in thickness towards its bottom end, but of uniform internal diameter and with three projecting ribs extending down its inside surface at uniform circumferential distances apart, of a vacuum pipe connection leading to the inside of the inner lining, a pulsator pipe connection leading to the space around the inner lining, a cylinder open at one end and in communication with the pulsator pipe at its closed end, a piston and piston rod within such cylinder, a pivoted valve mounted within the vacuum pipe connection, a crank arm upon the valve's pivot, adapted when turned, to close the valve, and connected to the piston rod and means for retaining the valve in a normally open condition, substantially as specified.

3. In milking machines, the combination with a teat cup having an outer casing and an inner inflatable lining formed with a wall increasing in thickness towards its bottom end, but of uniform internal diameter and with three projecting ribs extending down its inside surface at uniform circumferential distances apart, of means for alternately connecting the space between the inner lining and casing with the atmosphere, and a vacuum source such means consisting of a flat disk having two apertures therein communicating respectively with a connection leading to the vacuum, and with the space around the teat cup lining, and a wheel rotating against the face of the disk and having a passage in its surface, adjacent to the disk, adapted at a point in the wheel's revolution, to connect the two apertures together, and having an aperture through it, which at a point in the wheel's revolution is adapted to coincide with the aperture in the disk that is in communication with the space around the teat cup lining, substantially as specified.

In testimony whereof, I have signed this specification in the presence of two subscribing witnesses.

AMBROSE RIDD.

Witnesses:
W. M. BORLASE,
H. ALEXANDER.